US012810094B2

(12) United States Patent
Bernard et al.

(10) Patent No.: US 12,810,094 B2
(45) Date of Patent: Nov. 24, 2026

(54) TOUCHLESS SELECTION OF MACHINE READABLE CODES IN DENSELY POPULATED ENVIRONMENTS

(71) Applicant: CORNING RESEARCH & DEVELOPMENT CORPORATION, Corning, NY (US)

(72) Inventors: Thomas Bernard, Trelissac (FR); Anderson Bordim, Montreal (CA); Quentin Brun, Sendets (FR); Jeremie Georges Gerard Petitjean, Denguin (FR); Mojtaba Peyvandy, Montreal (CA)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 19/384,706

(22) Filed: Nov. 10, 2025

(65) Prior Publication Data

US 2026/0134242 A1 May 14, 2026

Related U.S. Application Data

(60) Provisional application No. 63/719,693, filed on Nov. 13, 2024.

(51) Int. Cl.

*G06K 7/14* (2006.01)
*G06F 3/04812* (2022.01)
*G06F 3/04842* (2022.01)

(52) U.S. Cl.

CPC ......... *G06K 7/1443* (2013.01); *G06K 7/1447* (2013.01)

(58) Field of Classification Search

CPC .............. G06K 7/1443; G06F 3/04812; G06F 3/04842

(Continued)

(56) References Cited

U.S. PATENT DOCUMENTS 8,596,523 B2 * 12/2013 Murray .............. H04N 1/00198 358/1.14
2015/0126245 A1 5/2015 Barkan et al.

(Continued)

OTHER PUBLICATIONS

Extended European search report, EP application No. 25214380.5, dated Feb. 26, 2026, 10 pages.

(Continued)

*Primary Examiner* — Toan C Ly
(74) *Attorney, Agent, or Firm* — William D. Doyle

(57) ABSTRACT

A method, system, and computer program product for reading labels. In response to an object of the one or more objects being targeted, the object is identified as a targeted object and a select timer it started. Once the select timer has started, it continues to run whether or not the targeted object continues to be targeted. The targeted object is selected if it is being targeted when the select timer elapses. If the targeted object is not being targeted when the select timer elapses, a validate timer may be started and the targeted object selected if is retargeted before the validate timer elapses. If another object is targeted prior to the select timer elapsing, the other object may be identified as the targeted object and the select timer restarted. Objects are targeted by orienting the reader so that an aiming feature in the video feed touches the targeted object.

20 Claims, 9 Drawing Sheets

(58) Field of Classification Search
USPC .................................................... 235/462.08
See application file for complete search history.

(56) References Cited

U.S. PATENT DOCUMENTS

| | | | |
|---|---|---|---|
| 2015/0138084 | A1 | 5/2015 | Hennelly et al. |
| 2018/0284962 | A1 | 10/2018 | Ballard et al. |
| 2023/0042715 | A1 | 2/2023 | Brun et al. |

OTHER PUBLICATIONS

Isomoto et al., "Interaction Design of Dwell Selection Toward Gaze-based AR/VR Interaction", Retrieved from: https://arxiv.org/pdf/2204.08156.pdf, Apr. 18, 2022, 2 pages.
Mohan et al., "DualGaze: Addressing the Midas Touch Problem in Gaze Mediated VR Interaction", International Symposium on Mixed and Augmented Reality Adjunct (ISMAR-Adjunct), 2018, 6 pages.
Vincent, "Handheld Augmented Reality Interaction: Spatial Relations", Retrieved from: https://theses.hal.science/tel-01551808/, Oct. 2, 2014, 206 pages.

* cited by examiner

TOUCHLESS SELECTION OF MACHINE READABLE CODES IN DENSELY POPULATED ENVIRONMENTS

RELATED APPLICATIONS

This application claims the benefit of priority of U.S. Provisional Application Ser. No. 63/719,693 filed on Nov. 13, 2024, the content of which is relied upon and incorporated herein by reference in its entirety.

TECHNICAL FIELD

This disclosure relates generally to identifying components in a data network, and more particularly to systems and methods for accurately selecting one machine readable code out of a plurality of machine readable codes in a live video feed of a handheld device.

BACKGROUND

The large growth of the Internet has led businesses and other organizations to develop large scale data centers for organizing, processing, storing, and disseminating large amounts of data. Data centers contain a wide range of information technology equipment including, for example, servers, networking switches, routers, storage systems, etc. Data centers further include a large amount of cabling and racks to organize and interconnect the equipment in the data center. Modern data centers may include multi-building campuses having, for example, one primary or main building and a number of auxiliary buildings in close proximity to the main building. Information technology equipment in the buildings on campus is typically interconnected by one or more local fiber optic networks.

In order to organize equipment in data centers, the buildings on the campus are typically divided into rooms or other identifiable physical spaces. Each space may then include multiple racks that are arranged in identifiable rows within the space. Each of the racks may then be further divided into shelves which hold the equipment. Each piece of equipment may include one or more ports for providing a data connection to another piece of equipment to form a network. For example, the racks may include a plurality of patch panels, each having a plurality of ports for making connections with other ports. Thus, the physical location of various ports in the data center may be designated by building, space, row, rack, shelf, and finally port.

In an operational data center, connections are made between various ports of patch panels in order to connect different aspects of the data network. These connections may be made, for example, with a fiber optic or copper wire patch cord, which typically includes a length of fiber optic or copper wire cable terminated at both ends with a connector. The connectors of the patch cord are then inserted into certain ports in designated patch panels to achieve a desired connection between the information technology equipment. To keep track of the very large number of connections and patch cords associated with a data center, each end of each patch cord and the port to which they are connected will generally be identified by a label including a machine readable code.

FIG. 1 depicts a typical data center environment in which a network technician is using a label reading device 10 (e.g., a smartphone) to identify ports 12 in a rack 14 that is part of a row 16 of racks 14, such as might be found in a data center. Each port 12 in the rack 16 is associated with a label 18 including a machine readable code. The label reading device 10 includes a camera 20 having a field of view 22 that covers a large number of labels 18. To select a particular label 18 for decoding, the user takes a still image of the rack 16, and then uses their finger to select the label 18 by touching the image of the label 18 on the touchscreen of the label reading device 10. Freezing the live feed so that the user can interact with the frozen image has certain disadvantages, however. For example, selecting labels from a still image can lead to confusion and incorrect selections due to the user losing the cognitive benefits provided by the live video feed. These disadvantages are especially troublesome when there are a large number of labels 18 in the still image.

Nevertheless, labels 18 are normally selected from a still image rather than a live video feed because selecting labels 18 directly from a live video feed is difficult and error prone. The difficulties arise due to small machine readable codes, occlusion of labels by dangling patch chords (not shown), clutter, image movement from shaking hands, etc. Moreover, the user's aim at one label may tend to be thrown off by touching the screen, which leads to movement in the device and a corresponding loss of the target label. Thus, when the user touches the screen of the device, the position of the device may change, resulting in an erroneous selection when there is another label close to the first one.

Auto selection of labels is also problematic, and often selects the wrong label due to the large number of labels in the video feed. Moreover, the need to use two hands (one for aiming the label reading device and another for touching the screen or to stay secure) means that the user has no hands remaining to move cables and other obstructions. Using touch interaction on a live feed (with moving elements) also requires a large touch area on the display screen (e.g., at least 4×4 cm) due to the need of the user to constantly see the target. However, even with this large touch area, when the user touches the area, their finger tends to occlude the view. Still further, because machine readable code detection for one or more labels in the image of the live feed may fail (e.g., when there is movement, or if the focus is not perfect), the device may often be unable to read the machine readable code at the exact time of the touch interaction. For at least these reasons, selecting labels in a live video feed both slows the process of reading labels and increases the risk of selection errors.

The same challenges mentioned above may also be present in other network environments, such as the networks of telecommunications operators for fiber-to-the-home (FTTH) services or the like. For example, a technician installing or maintaining such networks may need to identify ports in fiber distribution hubs, cabinets, or other terminals that contain densely populated patching/connection areas. The technician may use a label reader for this purpose, but have the same difficulties mentioned above for the ports 12.

Thus, there is a need in the data network industry for improved methods, systems, and software products for reading asset identifier labels. More particularly, there is a need for methods, systems, and software products for accurately selecting labels from a live video feed in environments with a high density of labels that only require one hand for holding the label reading device.

SUMMARY

In one aspect of the disclosure, an improved method of reading labels is disclosed. The method includes displaying a live video feed including one or more objects each having a machine readable code. In response to one object of the one or more objects being targeted, the method identifies the one object as a targeted object and starts a select timer that continues to run whether or not the targeted object continues to be targeted once the select timer has started. The method further includes selecting the targeted object in response to the targeted object being targeted when the select timer elapses.

In one embodiment of the disclosed method, the method may further include identifying another of the one or more objects as the targeted object and restarting the select timer in response to the other object being targeted prior to the select timer elapsing.

In another embodiment of the disclosed method, the method may further include in response to the targeted object not being targeted when the select timer elapses, starting a validate timer, and selecting the targeted object in response to the targeted object being retargeted before the validate timer elapses.

In another embodiment of the disclosed method, the method may further include clearing the targeted object in response to the validate timer elapsing without the targeted object being retargeted.

In another embodiment of the disclosed method, the method may further include displaying an aiming feature on the live video feed, and determining an object is being targeted when at least a portion of the aiming feature touches the object.

In another embodiment of the disclosed method, the aiming feature may be in a fixed position in the live video feed.

In another embodiment of the disclosed method, the method may further include detecting the machine readable code of one or more of the one or more objects.

In another embodiment of the disclosed method, the method may further include displaying an identification feature indicating the machine readable code has been detected for each of the one or more objects for which the machine readable code is detected.

In another embodiment of the disclosed method, the method may further include displaying an aiming feature on the live video feed, and an object may be considered as being targeted when both at least a portion of the aiming feature touches the object and the machine readable code of the object is detected.

In another embodiment of the disclosed method, the method may further include displaying an indication of a status of the select timer on the live video feed.

In another embodiment of the disclosed method, the one or more objects may include a plurality of objects each associated with an optical network asset, and the plurality of objects may be arranged on an optical connector patch panel such that the machine readable codes are spaced less than 20 mm apart along at least one axis of the optical connector patch panel.

In another aspect of the disclosure, an improved system for reading labels is disclosed. The system includes a display, a camera, one or more processors operatively coupled to the display and the camera, and a memory including program code. When executed by the one or more processors, the program causes the system to display the live video feed including the one or more objects each having the machine readable code, in response to one object of the one or more objects being targeted, identify the one object as the targeted object and start the select timer that continues to run whether or not the targeted object continues to be targeted once the select timer has started, and select the targeted object in response to the targeted object being targeted when the select timer elapses.

In one embodiment of the disclosed system, the program code may further cause the system to identify the other object of the one or more objects as the targeted object and restart the select timer in response to the other object being targeted prior to the select timer elapsing.

In another embodiment of the disclosed system, the program code may further cause the system to start the validate timer in response to the targeted object not being targeted when the select timer elapses, and select the targeted object in response to the targeted object being retargeted before the validate timer elapses.

In another embodiment of the disclosed system, the program code may further cause the system to clear the targeted object in response to the validate timer elapsing without the targeted object being targeted.

In another embodiment of the disclosed system, the program code may further cause the system to display the aiming feature on the live video feed, and determine an object is being targeted when at least a portion of the aiming feature touches the object.

In another embodiment of the disclosed system, the program code may further cause the system to place the aiming feature in the fixed position in the live video feed.

In another embodiment of the disclosed system, the program code may further cause the system to detect the machine readable code of one or more of the one or more objects.

In another embodiment of the disclosed system, the program code may further cause the system to display the identification feature indicating the machine readable code has been detected for each of the one or more objects for which the machine readable code is detected.

In another embodiment of the disclosed system, the program code may further cause the system to display the aiming feature on the live video feed, and consider an object as being targeted when both at least a portion of the aiming feature touches the object and the machine readable code of the object is detected.

In another embodiment of the disclosed system, the program code may further cause the system to display the indication of the status of the select timer on the live video feed.

In another embodiment of the disclosed system, the one or more objects may include the plurality of objects each associated with the optical network asset, and the plurality of objects may be arranged on the optical connector patch panel such that the machine readable codes are spaced less than 20 mm apart along the at least one axis of the optical connector patch panel.

In another aspect of the disclosure, a computer program product is provided. The computer program product includes a non-transitory computer-readable storage medium, and program code stored on the non-transitory computer-readable storage medium. The program code is configured so that, when executed by one or more processors, the program code causes the one or more processors to display the live video feed including one or more objects each having the machine readable code, in response to one object of the one or more objects being targeted, identify the one object as the targeted object and start the select timer that continues to run whether or not the targeted object continues to be targeted once the select timer has started, and select the targeted object in response to the targeted object being targeted when the select timer elapses.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
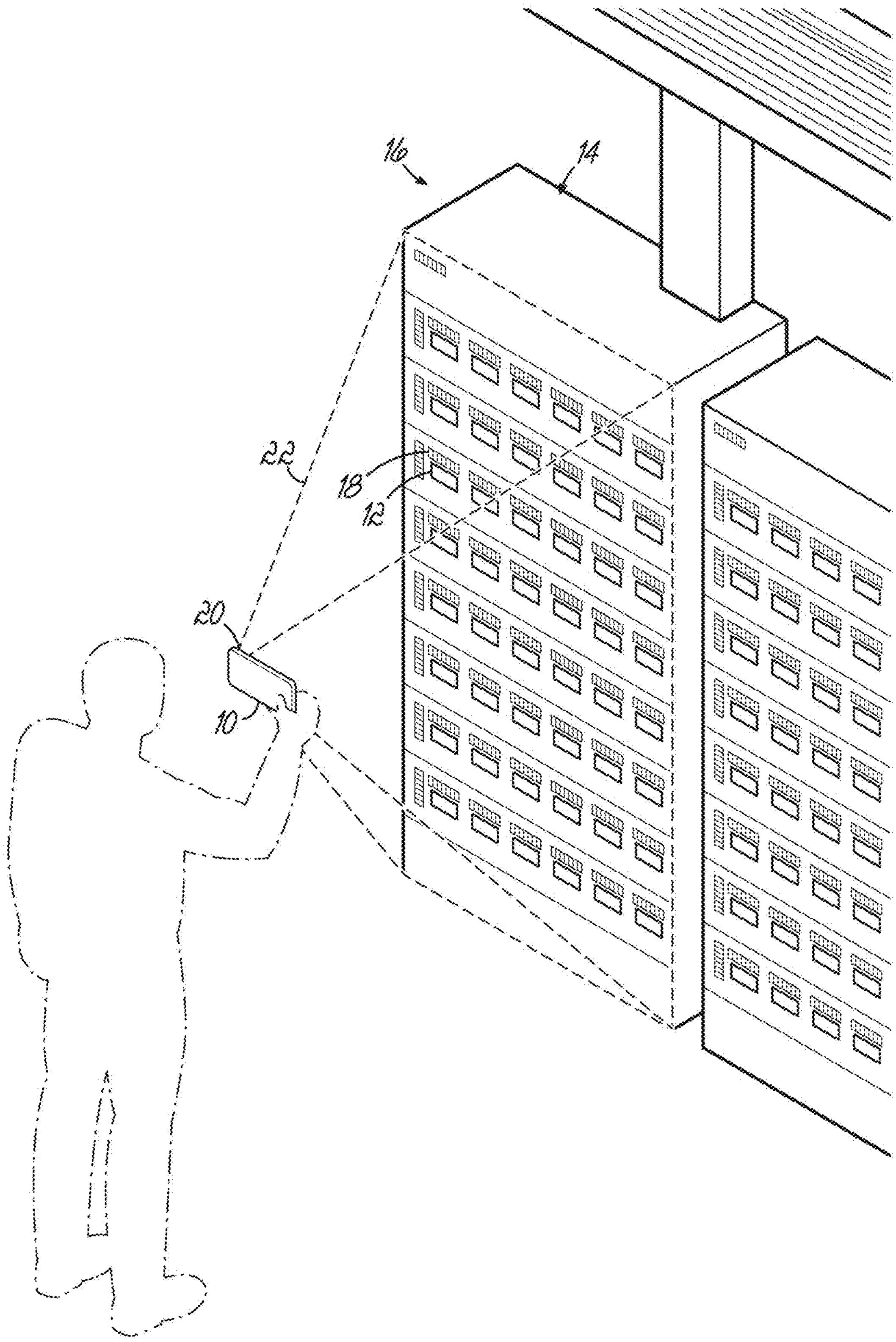
FIG. 1 is a diagrammatic view of a network technician using a smartphone to identify ports in a rack that is part of a row of racks in a data center.

Various embodiments will be further clarified by examples in the description below. In general, the description relates to a method and system for selecting and reading one of a plurality of labels that identify network components (referred to generally herein as "network assets") in an environment that includes large numbers of closely spaced labels. The disclosed label reading system enables someone using a handheld label reading device to accurately interact with small machine readable codes in an environment with multiple other similar machine readable codes. The label reading device may be a smartphone or other device that includes a camera and a screen that can display a video feed from the camera. The label reading device may also superimpose a reticle over the video feed to identify a fixed aiming point. The user may move the label reading device to align the aiming point with a targeted machine readable code in the video feed. By touching the targeted machine readable code with the aiming point, the user may cause the system to select the machine readable code. The fixed aiming point and target selection feature enables operation of the label reading device with only one hand in both low and high light levels, and avoids any need for the user to touch the screen or otherwise manipulate the device. The label reading device includes a novel selection algorithm that detects targeting and selects the target label based thereon. The label reading device may also include image stabilization (e.g., one or more of electronic image stabilization and optical image stabilization) to reduce jitter from shaky hands. When present, image stabilization may work cooperatively with the selection algorithm to further improve the accuracy of the label selection process.

The target detection feature may be configured to improve the performance of computer vision algorithms that locate and decode machine readable codes from the live video feed. For example, in cases where performance limitations of the label reading device prevent the computer vision algorithms from locating and decoding machine readable codes for each frame of the video feed. When this happens in a conventional system, the system may be unable to locate or decode a machine readable code seen by the user. The system may then fail to decode the machine readable code until a later frame, at which point the user may have moved off target. As described in detail below, the target detection feature is configured to mitigate this issue by allowing the user to temporarily stray off target without having to restart the selection process.

By maintaining a live video feed, the system facilitates the user correlating on-screen virtual interaction with the physical objects being imaged. The system may provide constant feedback to the user by, for example, highlighting a selected label on the live video feed. Maintaining a live feed with continuous feedback may reduce the risk for human error as well as ensure that the user maintains their link with the physical environment and does not become distracted. System feedback may include one or more of visual feedback and audible feedback.

Machine readable codes (often referred to as "barcodes") encode data in a visual, machine readable form. Examples of commonly used types of machine readable code include a Universal Product Code (UPC), quick-read (QR) codes, and data matrix codes. The UPC code is a type of one-dimensional barcode, whereas the QR code and data matrix code are each a type of two-dimensional barcode. One and two-dimensional barcodes can be printed at various densities to accommodate the printing and scanning capabilities of the equipment used to make and read the labels that include the barcodes. The smallest element from which a barcode code is formed is commonly referred to as a module.

A typical QR code identifying a network asset may include a plurality of black modules, e.g., dots or cells, arranged in a square pattern on a white background. Although QR codes are illustrated in the figures, this is merely an example, as those skilled in the art will appreciate that data matrix codes or other machine readable codes may be used instead. A typical data matrix code identifying a network asset may include a plurality of black and white modules, e.g., dots or cells. The modules may be arranged in either a square or rectangular pattern (sometimes referred to as the "data matrix"), with each module representing one bit of data. A data matrix may comprise two solid adjacent borders in an "L" shape (called the "finder pattern") and two other borders consisting of alternating dark and light modules (called the "timing pattern"). Within these borders are the rows and columns of modules that encode information associated with the network asset, such as a unique identifier. Typical data matrix codes used to identify network assets may be relatively small (e.g., 3×3 mm to 10×10 mm) and have a module size of about 0.2 mm to 0.5 mm. These barcodes are often deployed with high densities, e.g., at least one barcode per square centimeter, with adjacent barcodes spaced less than 1 mm from each other in all directions.

Figure 2:
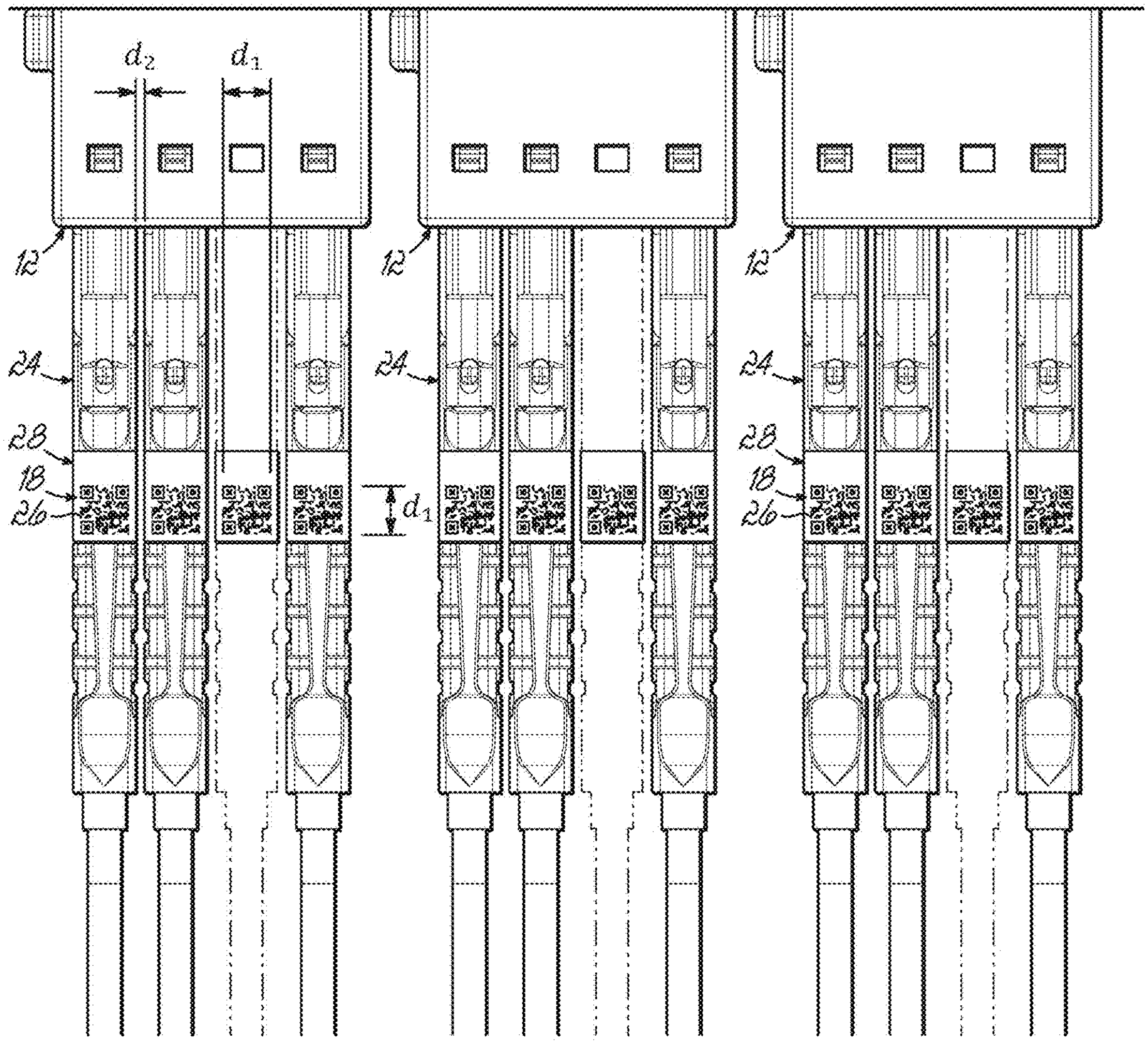
FIG. 2 is a diagrammatic view of an exemplary group of connectors each associated with a label including a machine readable code.

FIG. 2 depicts an exemplary group of connectors 24, e.g., MMC connectors. Each connector 24 may be operatively coupled to a respective port 12 and associated with a label 18 including a machine readable code 26, which is shown in the form of a QR code. The labels 18 may be coupled to the connectors 24, for example, by a label mount 28 that is attached to or integral with the connector 24. The exemplary machine readable codes 26 have dimensions $d_1 \times d_1$ (e.g., where $d_1$=3.2 mm), although embodiments are not limited to a label 18 having a particular size or shape. The ports 12 may be arranged in groups (e.g., groups of four) so that the machine readable codes 26 are closely spaced (e.g., $d_2 \leq 0.5$ mm apart) and aligned horizontally. Although not shown by FIG. 2, in some embodiments, one or more of the ports 12 may also be associated with a label 18.

Figure 3:
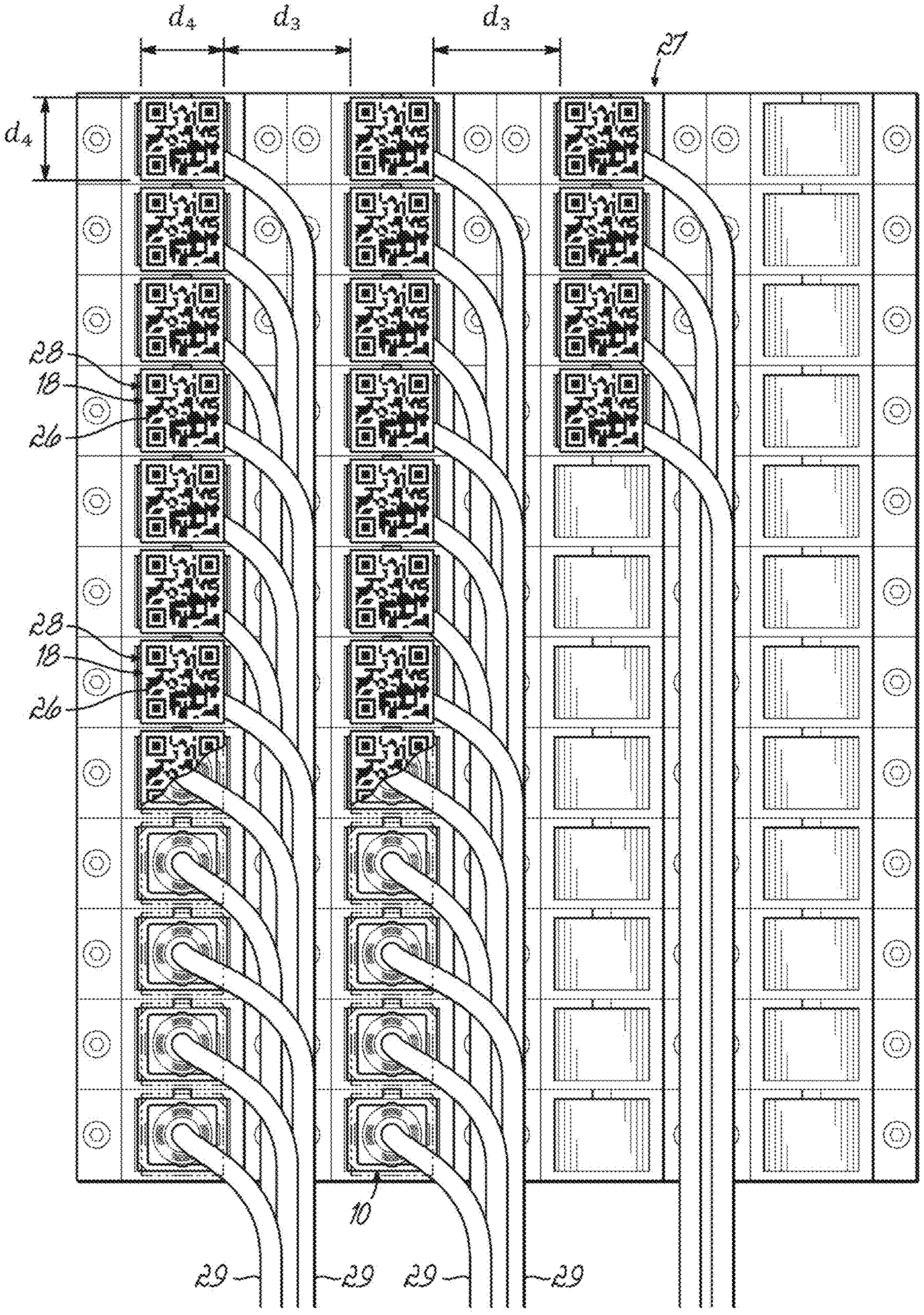
FIG. 3 is a diagrammatic view of another exemplary group of connectors each associated with a label including a machine readable code.

FIG. 3 depicts an exemplary arrangement of labels 18 for a patch panel 27, e.g., an SC connector patch panel. Each label 18 includes a machine readable code 26 with dimensions $d_4 \times d_4$ (e.g. $d_4$=7 mm), and may be operatively coupled to its respective connector 24 by a label mount 28. The label mount 28 may attach to the connector 24 and extend rearward therefrom to provide space for routing the optical fiber 29 behind the label 18. Network technicians may commonly encounter large groups of labels 18 arranged so that their machine readable codes 26 are spaced less than 20 mm, 10 mm, 5 mm, or 1 mm apart along at least one axis, e.g., one or more of a vertical axis or a horizontal axis. In the depicted embodiment, the labels 18 are arranged in columns with little or no space between adjacent machine readable codes 26 along the vertical axis, and with a space (e.g., $d_5$=12 mm) between machine readable codes along the horizontal axis. The dimensions and arrangements of the machine readable codes in FIGS. 2 and 3 may result in a minimum linear density of one machine readable code per centimeter and about 0.1 machine readable codes per $cm^2$, with SC connector patch panels ranging from 0.24 to 0.4 machine readable codes per $cm^2$. At a typical scanning distance of 10 to 50 cm, the field of view 22 may cover from 50 to 420 $cm^2$. Under this usage scenario, the grid-like layout of labels 18 depicted by FIG. 3 may result in between 5 and 168 machine readable codes 26 being visible within the field of view 22 of label reading device 10.

Figure 4:
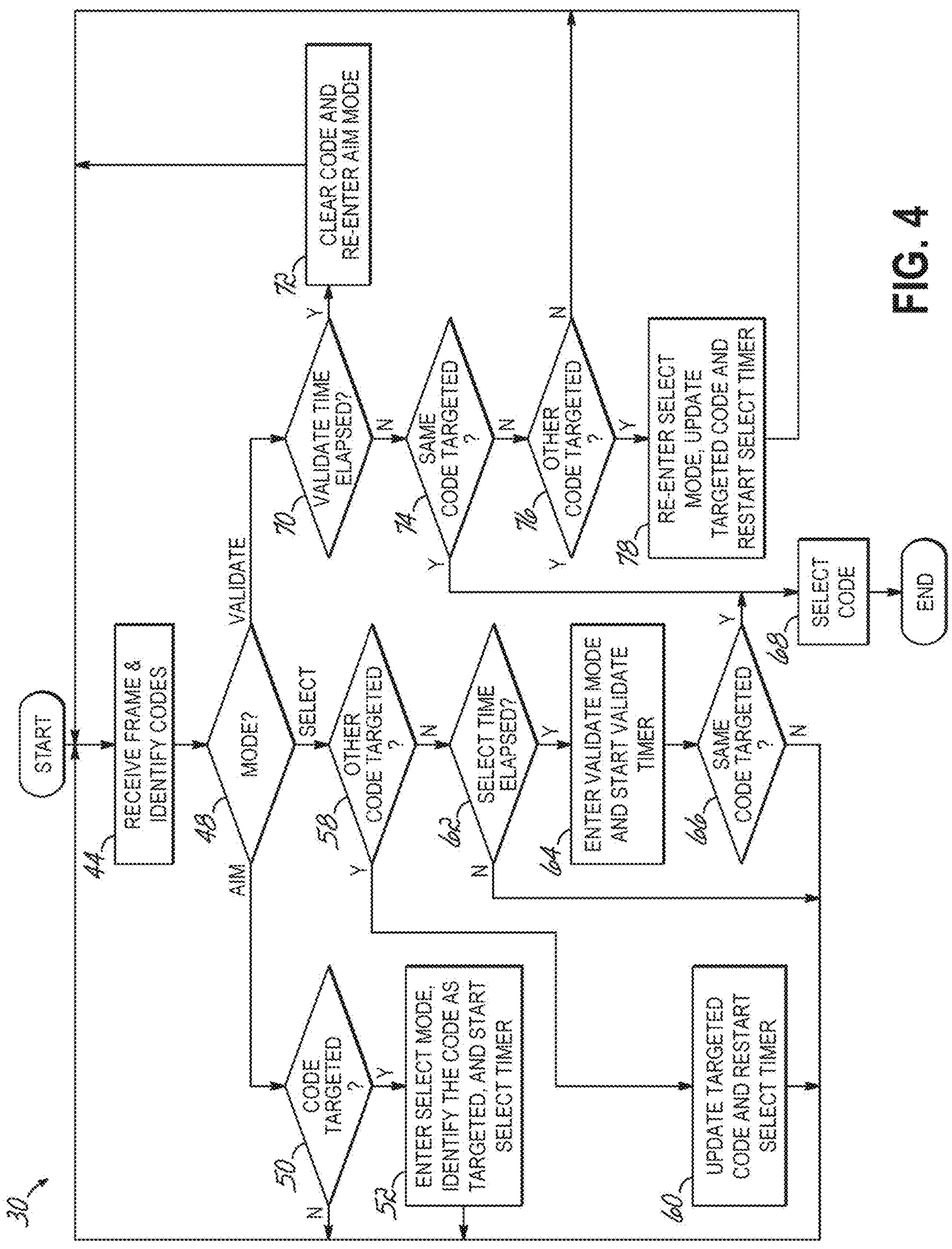
FIG. 4 is a flowchart illustrating a process for reading labels including machine readable codes such as depicted by FIGS. 2 and 3.

FIG. 4 depicts a flow chart illustrating an exemplary process 30 that may be used to facilitate acquisition and selection of a specific object (e.g., a machine readable code 26) in an environment including multiple objects. FIGS. 5-8 depict an exemplary user interface 32 that may be displayed by the label reading device 10 during execution of the process 30. The user interface 32 is depicted as displaying a live video feed 34, which may be received from the camera 20 of label reading device 10. An aiming feature 36 (e.g., a reticle) and one or more augmented reality features (e.g., an identification feature 46) may be superimposed onto the video feed 34. The aiming feature 36 may include an inner aiming element 38 (e.g., an inner circle) and an outer aiming element 40 (e.g., an outer circle). Although the exemplary aiming elements are depicted as circles, it should be understood that the aiming feature 36 may be defined by other types of aiming elements, such as triangles, squares, etc. Accordingly, embodiments of the user interface 32 are not limited to the depicted aiming feature 36 or identification features 46. The inner aiming element 38 and outer aiming element 40 may be centered on a common aiming point, and the common aiming point may be in a fixed position in the video feed 34, e.g., in the center of the video feed 34.

Figure 5:
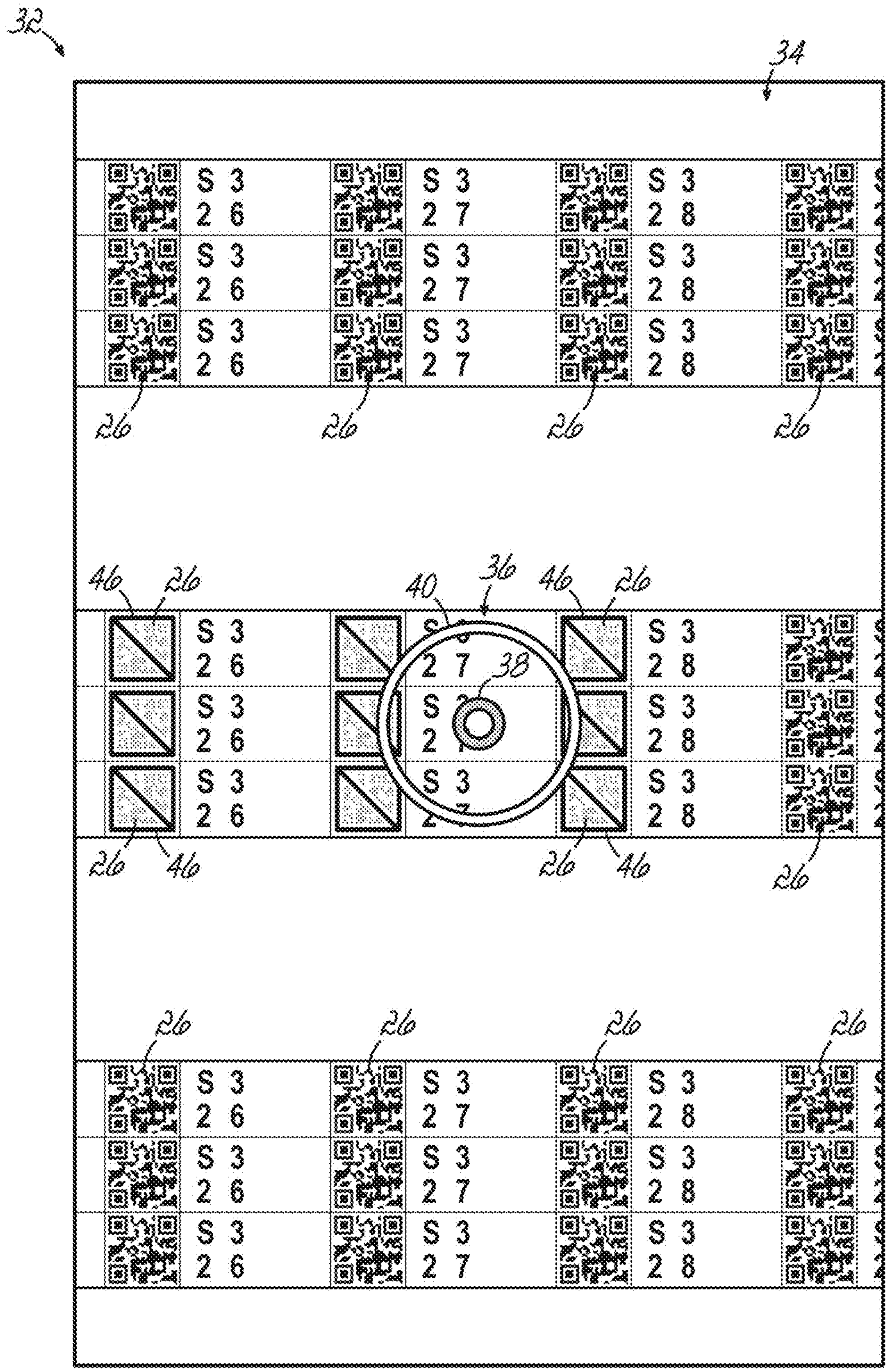
FIGS. 5-8 are diagrammatic views of an exemplary live video feed that may be displayed by a label reading device executing the process of FIG. 4.

With continued reference to FIG. 4, and as shown by FIG. 5, in block 44, the process 30 may receive a frame of the video feed 34 and identify one or more machine readable codes 26 that appear in the frame. In response to the process 30 detecting a machine readable code 26, the process 30 may cause the user interface 32 to indicate which portions of the video feed 34 have been identified as including a machine readable code 26. This indication may be provided by displaying an identification feature 46 indicating the machine readable code 26 in question has been detected. This may include, for example, superimposing a bounding box or other feature around or over the machine readable code 26. In some embodiments, the identification feature 46 may only be displayed for machine readable codes 26 that are within a certain distance of the aiming feature 36 (e.g., to avoid cluttering of the video feed 34 or to reduce demands on the processing power of the label reading device 10), while in other embodiments, the identification feature 46 may be displayed for each machine readable code 26 detected in the video feed 34.

In block 48, the process 30 determines if it is in "aim mode", "select mode", or "validate mode". Aim mode may be the default mode for the process 30 when the process 30 is launched and the inner aiming feature is not touching a machine readable code 26. If the process 30 is in aim mode ("AIM" branch of decision block 48), the process 30 may proceed to block 50 and determine if a machine readable code 26 is targeted.

Figure 6:
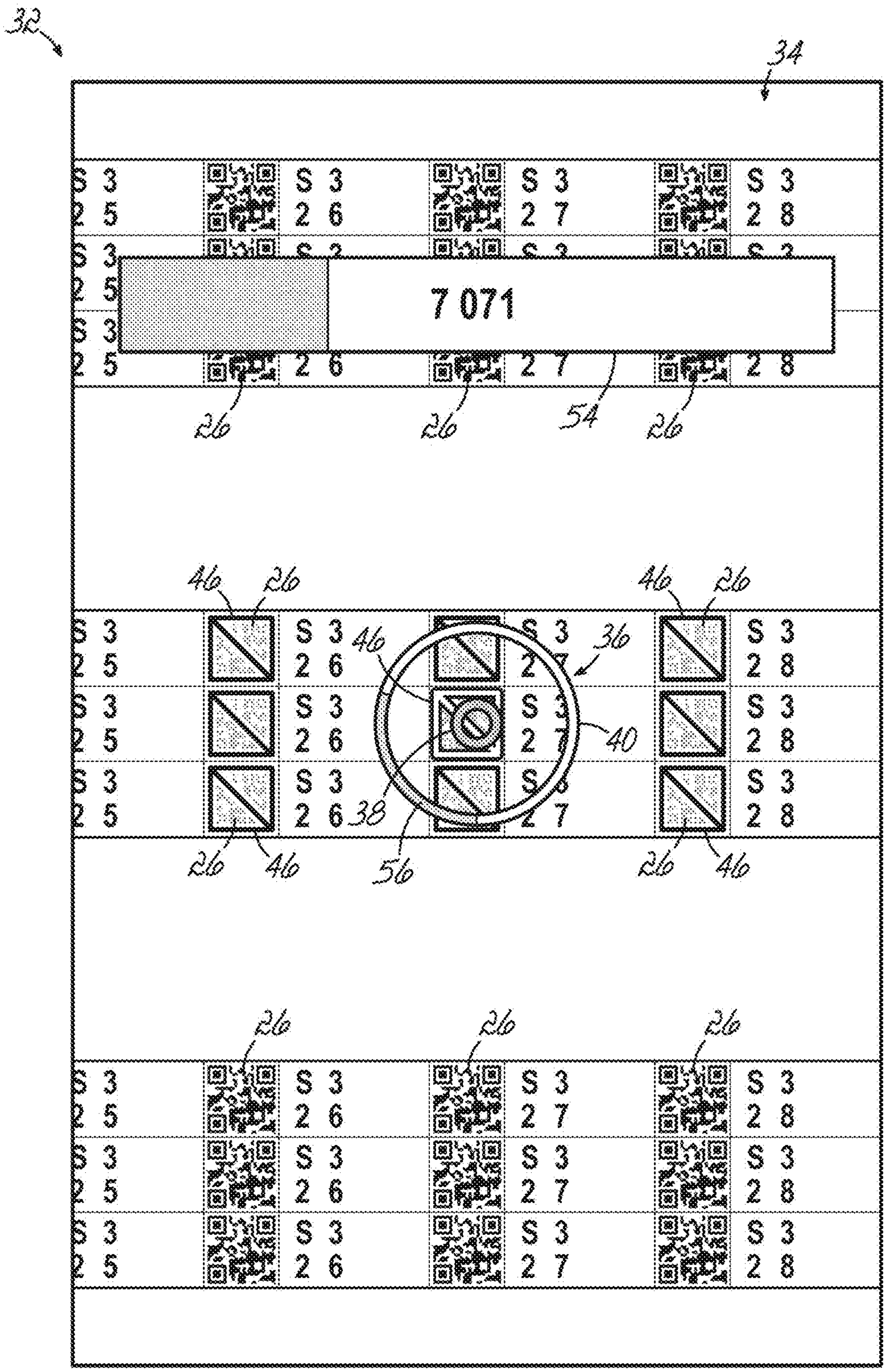

Referring now to FIG. 6, a machine readable code 26 may be considered as targeted whenever the inner aiming element 38 is touching at least a portion of the machine readable code 26. In cases where the inner aiming element 38 is touching more than one machine readable code 26, the targeted machine readable code 26 may be the one that occupies the most area within the inner aiming element 38. In an alternative embodiment, the targeted machine readable code 26 may be sticky, meaning that once a machine readable code 26 is targeted, it may remain targeted even if the inner aiming element 38 touches another machine readable code 26 until the inner aiming element 38 no longer touches the targeted machine readable code 26. In yet another alternative embodiment, a machine readable code may only be considered targeted if the inner aiming element 38 is touching only that machine readable code 26.

The inner aiming element 38 may be referred to as "on target" when the machine readable code 26 in question is targeted by the aiming element 38. In contrast, the inner aiming element 38 may be considered as not on target (i.e., "off target") if the inner aiming element 38 is not touching at least a portion of the machine readable code 26 in question. The inner aiming element 38 may also be considered as off target while the inner aiming element 38 is touching the area of the video feed 34 including the machine readable code 26 if the label reading device 10 fails to detect the machine readable code 26 in that frame. Thus, a machine readable code 26 that is in contact with the inner aiming element 38 in a frame may be considered as untargeted if the label reading device fails to detect the machine readable code 26 in that frame.

In alternative embodiments, the inner aiming element 38 may considered to be "on target" when the machine readable code 26 in question is targeted by the aiming element 38 at least a certain number of times in a short time period. The number of times and short time period are predetermined for the process 30. As a specific example, in some embodiments the process 30 may be configured such that the inner aiming element 38 contacting the machine readable code 26 in question at least three times in under 0.5 seconds still results in that machine readable code 26 being "on target." The machine readable code 26 in such embodiments is therefore not considered to be "off target" unless the predetermined short time period (e.g., 0.5 seconds) has passed without the inner aiming element 38 contacting the machine readable code 26 the predetermined number of times (e.g., three times).

Figure 7:
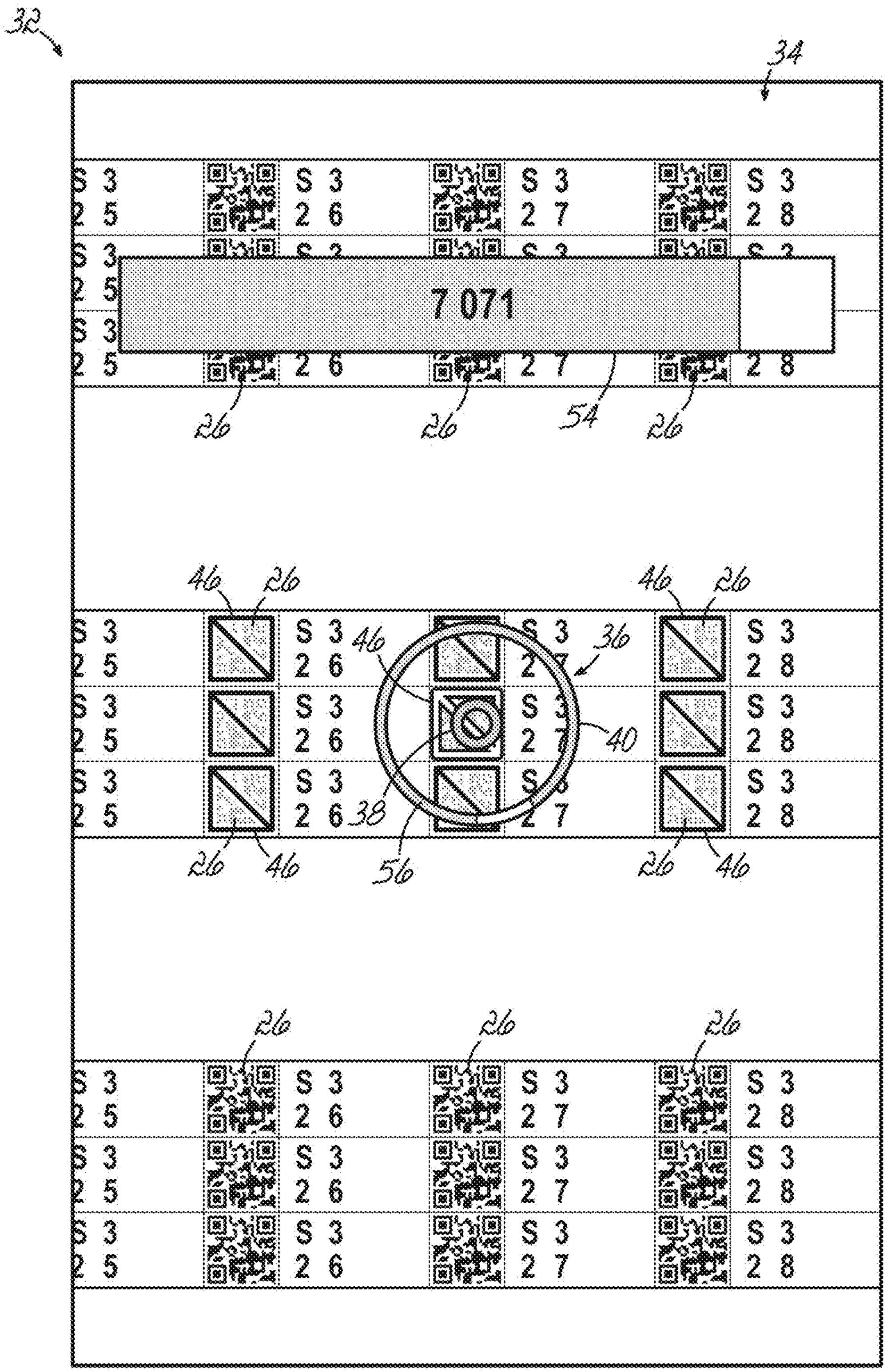

If, as shown in FIG. 5, no machine readable codes 26 are targeted ("NO" branch of decision block 50), the process 30 may return to block 44 and continue analyzing frames of the video feed 34 and identifying machine readable codes 26 therein. If, as shown in FIGS. 6 and 7, a machine readable code is targeted ("YES" branch of decision block 50), the process 30 may proceed to block 52, enter select mode, identify the machine readable code as the targeted machine readable code, start a select timer, and return to block 44. As described below, while in select mode, the process 30 may determine if the user intends to select the targeted machine readable code 26.

Referring now to FIG. 6, in response to entering select mode, the process 30 may cause the user interface 32 to display an indication the select mode has been entered. This indication may include one or more of changing an aspect of the identification feature 46 associated with the targeted machine readable code 26, displaying a bar timer 54, and emitting an audible sound. The bar timer 54 may indicate a status of the select mode, e.g., how long the process 30 has been in the select mode and how long the process 30 will remain in the select mode before the targeted machine readable code 26 is selected. Changing the aspect of the identification feature may include, for example, changing a color or shape of the identification feature 46, causing the identification feature 46 to flash on and off, or any other change that would inform the user that the machine readable code 26 in question is a targeted machine readable code 26 in the process of being selected. The indication may also include starting a ring timer 56 that advances around the outer aiming element 40 to indicate the status of the select mode. This may provide the user with information about the status of selecting the machine readable code 26 without the user having to divert their gaze from the aiming feature 36.

In block 48, if the process 30 is in select mode ("SELECT" branch of decision block 48), the process 30 may proceed to block 58 and determine if a machine readable code 26 other than the machine readable code 26 that caused the process 30 to enter select mode (referred to herein as "another" or "the other" machine readable code 26) is being targeted. The term "the same machine readable code" may be used herein to refer to the machine readable code 26 targeted when the process 30 entered or restarted a current select mode. The term "another machine readable code" or "the other machine readable code" may be used to refer to any machine readable code other than the same machine readable code 26. Another machine readable code 26 may be targeted, for example, if the user's aim causes the inner aiming element 38 to come in contact with the other machine readable code 26 while in the select or validate modes.

If another machine readable code is being targeted ("YES" branch of decision block 58), the process 30 may proceed to block 60, update the targeted machine readable code 26 to be that of the other machine readable code 26, restart the select timer, and return to block 44. Thus, in response to the inner aiming element 38 touching another machine readable code 26, the process 30 may restart the selection subprocess with the other machine readable code 26 replacing the previously targeted machine readable code 26 as the targeted machine readable code.

If another machine readable code is not being targeted ("NO" branch of decision block 58), the process 30 may proceed to block 62 and determine if the select time has elapsed. The select time may have elapsed if the select timer has elapsed, e.g., has reached zero (for a countdown timer) or a threshold value (for a count up timer). If the select time has not elapsed ("NO" branch of decision block 62), the process 30 may return to block 44 and continue receiving frames and identifying machine readable codes 26 in those frames. If the select time has elapsed ("YES" branch of decision block 62), the process 30 may proceed to block 68, enter validate mode, and start a validate timer.

Thus, once the process 30 has entered select mode, the process 30 may ultimately enter validate mode so long as another machine readable code 26 is not targeted before the select time elapses. The select time may be set to value that optimizes selectivity (e.g., 2.0 to 2.5 seconds), and may be varied depending on, for example, label or code size, lighting conditions, and barcode reading frequency for the current video feed. As another example, in some embodiments the select time may be set based on the number machine readable codes 26 identified in the video feed 34 (e.g., at block 44). By not resetting the select timer unless another machine readable code is targeted, embodiments of process 30 may allow the inner aiming element 38 to drift off target (or the label reading device 10 fail to detect the machine readable code 26) while in select mode without resetting the select timer. This may improve the user experience by ignoring inadvertent movements of the label reading device 10 and failures of the label reading device 10 to consistently detect the targeted machine readable code 26.

In response to entering the validate mode, the process 30 may proceed to block 66 and determine if the same machine readable code is targeted, e.g., if the inner aiming element 38 is touching the same machine readable code 26 that last caused the process 30 to be in the select mode. If the same machine readable code 26 is targeted ("YES" branch of decision block 66), the process 30 may proceed to block 68 and select the targeted machine readable code 26. If the same machine readable code 26 is not targeted (e.g., if the inner aiming element 38 is not touching any machine readable codes 26), the process may return to block 44 and continue receiving frames and identifying machine readable codes 26 in those frames.

Returning again to block 48, if the process 30 determines it is in validate mode ("VALIDATE" branch of decision block 48), the process 30 may proceed to block 70 and determine if the validate time has elapsed. If the validate time has elapsed ("YES" branch of decision block 70), the process 30 may proceed to block 72, clear the targeted machine readable code, re-enter aim mode, and return to block 44. If the process 30 determines the validate time has not elapsed ("NO" branch of decision block 70), the process 30 may proceed to block 74 and determine if the same machine readable code is targeted. If the same machine readable code 26 is targeted ("YES" branch of decision block 74), the process 30 may proceed to block 68 and select the targeted machine readable code 26. If the same machine readable code 26 is not targeted, the process 30 may proceed to block 76.

In block 76, the process 30 may determine if another machine readable code 26 is targeted. If another machine readable code is not being targeted ("NO" branch of decision block 76), the process 30 may return to block 44 and continue receiving frames and identifying machine readable codes 26 in those frames. If another machine readable code is being targeted ("YES" branch of decision block 76), the process 30 may proceed to block 78, re-enter the select mode, update the targeted machine readable code 26 to be that of the other machine readable code 26, restart the select timer, and return to block 44. Thus, in response to the inner aiming element 38 touching another machine readable code 26 while in the validate mode, the process 30 may exit the validate mode, and restart the selection subprocess with the newly targeted machine readable code 26 replacing the previously targeted machine readable code 26 as the targeted machine readable code.

Performance of the selection feature may be improved by the label reading device 10 providing feedback to the user with indications of machine readable code readings in the area, timeout progress, and completion effects. Selection feature performance may also be improved by not resetting the selection timer if the aiming point or aiming feature 36 fails to touch the label 18 or if the label reading device 10 momentarily fails to read the machine readable code 26 while in select mode. Image stabilization may also be used to reduce the relative movement of the object, thereby further improving performance of the target selection feature.

Figure 8:
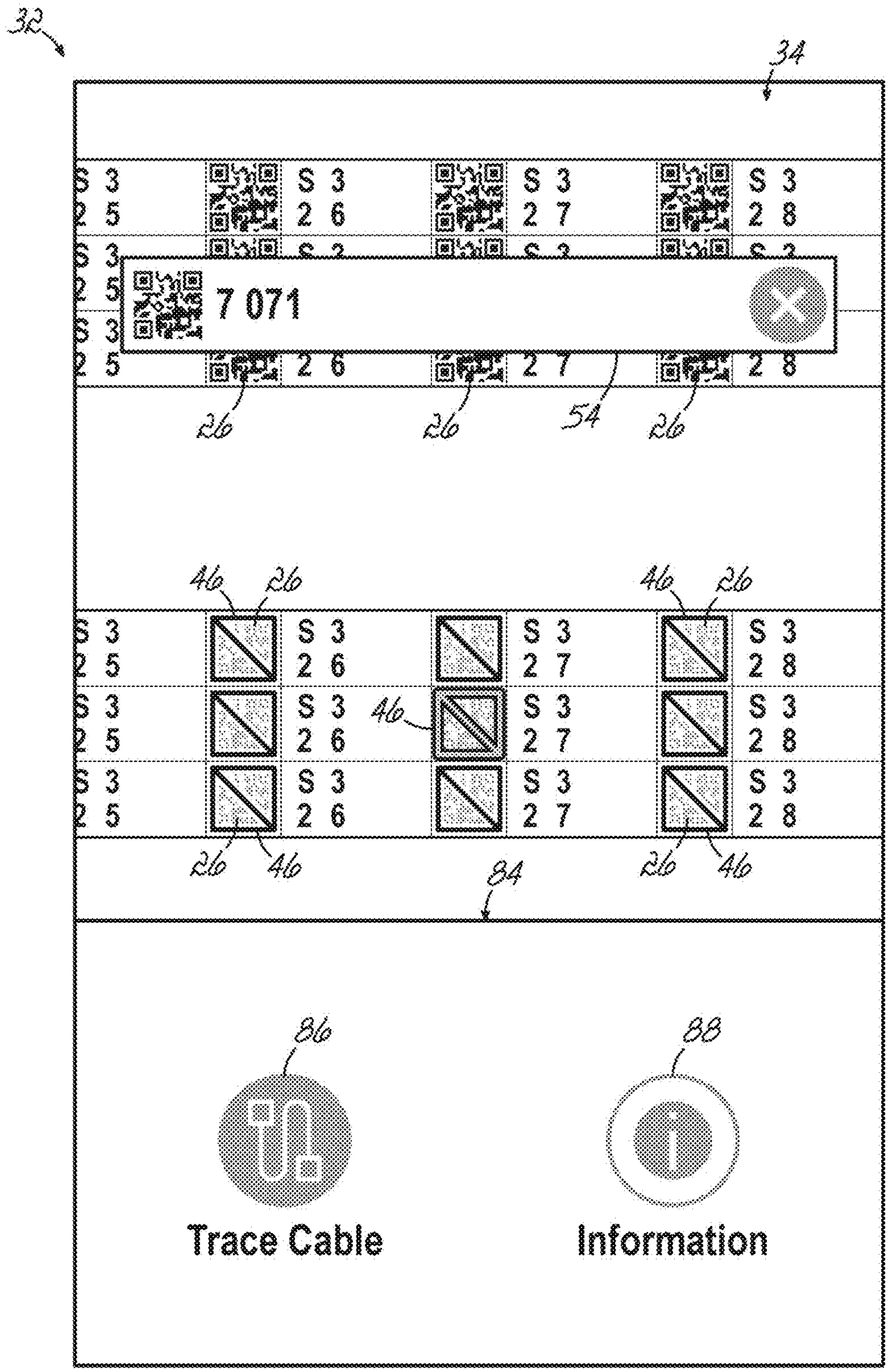

Referring to FIG. 8, in response to selecting the targeted machine readable code, the user interface may hide or otherwise stop displaying the aiming feature 36, further change the aspect of the identification feature 46 to indicate the targeted machine readable code has been selected (e.g., change the color from yellow to blue), and display a pop-up window 84. The pop-up window 84 may include one or more icons, such as a "trace cable" icon 86 and an "information" icon 88. Selecting these icons may cause the label reading device 10 to query a database and display information about the cable or port associated with the machine readable code 26.

Problems with selecting labels in a high density environment are expected to increase as fiber optic equipment becomes more crowded to accommodate demands from artificial intelligence and hyperscale datacenters. The disclosed label reading system addresses problems in reading labels in dense environments by being able to scan and select a specific label from large numbers of labels in the field of view of the label reading device 10. Unlike conventional systems, targeted objects are displayed in a live video feed delivered by a handheld device that can be effectively operated while being held in one hand. The targeted object may be a real physical object (e.g., a machine readable code 26) that is detected by a computer vision algorithm on one or more frames of the live video feed. Even though the targeted object may be relatively small (e.g., having an on screen size around 4 by 4 mm due to the machine readable code's physical size, camera field of view, and required scan distance), the disclosed system avoids the use of a magnifier/zoom feature. This allows the label reading system to avoid the disorientation and reduced accuracy of the link between the user's virtual interaction with the device and physical world caused by freezing or magnifying the image.

Figure 9:
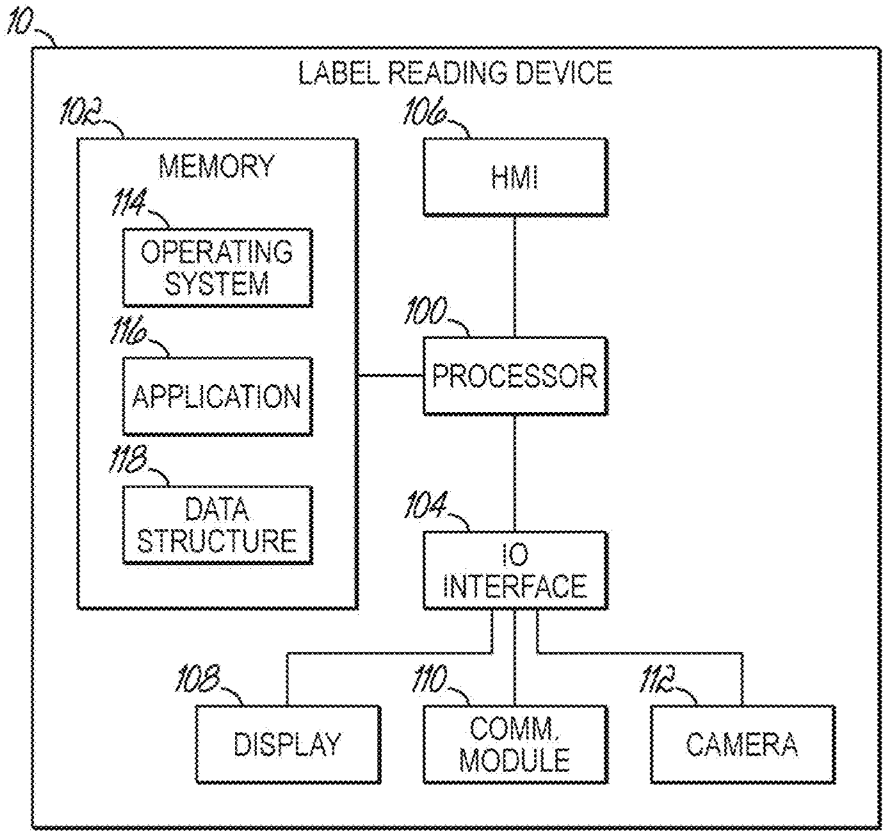
FIG. 9 is a schematic view of an exemplary label reading device that may be used to execute the process of FIG. 4 and display the live video feed of FIGS. 5-8.

FIG. 9 depicts an exemplary label reading device 10 including a processor 100, a memory 102, an input/output (I/O) interface 104, a Human Machine Interface (HMI) 106, a display 108, a communication module 110, and a camera 112. The processor 100 may include one or more devices that manipulate signals (analog or digital) based on operational instructions stored in memory 102. Memory 102 may include a single memory device or a plurality of memory devices capable of storing data. The processor 100 may operate under the control of an operating system 114 that resides in memory 102. The operating system 114 may manage computer resources so that computer program code embodied as one or more computer software applications, such as an application 116 residing in memory 102, may have instructions executed by the processor 100. One or more data structures 118 may also reside in memory 102, and may be used by the processor 100, operating system 114, or application 116 to store or manipulate data.

The I/O interface 104 may provide a machine interface that operatively couples the processor 100 to other devices and systems, such as the display 108, communication module 110, and camera 112. The application 116 may thereby work cooperatively with the other devices and systems by communicating via the I/O interface 104 to provide the various features, functions, applications, processes, or modules comprising embodiments of the label reading device 10. The application 116 may also have program code that is executed by one or more external resources, or otherwise rely on functions or signals provided by other system or network components external to the label reading device 10. Indeed, given the nearly endless hardware and software configurations possible, persons having ordinary skill in the art will understand that embodiments of the disclosure may include applications that are located externally to the label reading device 10, distributed among multiple computers or other external resources, or provided by computing resources (hardware and software) that are provided as a service over a network, such as a cloud computing service.

The HMI 106 may be operatively coupled to the processor 100 of label reading device 10 to allow a user to interact directly with the label reading device 10. The HMI 106 may include video or alphanumeric displays, a touch screen, a speaker, and any other suitable audio and visual indicators capable of providing data to the user. The HMI 106 may also include input devices and controls such as an alphanumeric keyboard, a pointing device, keypads, pushbuttons, control knobs, microphones, etc., capable of accepting commands or input from the user and transmitting the entered input to the processor 100.

The display 108 may form a part of the HMI 106, and may include a screen on the user device suitable for displaying visual information to the user. The label reading device 10 may display video in real time on the display 108 showing network assets and labels 18 within the field of view 22. The communication module 110 may be configured to connect to a communication network (not shown) through a wireless connection to a local access or cellular network. The communication module 110 may thereby enable the label reading device 10 to transmit data to and receive data from a database system.

While the present disclosure has been illustrated by the description of specific embodiments thereof, and while the embodiments have been described in considerable detail, it is not intended to restrict or in any way limit the scope of the appended claims to such detail. For example, although the machine readable code 26 is shown as a QR code, in alternative embodiments another type of machine readable code may be used, such as a data matrix code. The various features discussed herein may be used alone or in any combination within and between the various embodiments. Additional advantages and modifications will readily appear to those skilled in the art. The present disclosure in its broader aspects is therefore not limited to the specific details, representative apparatus and methods and illustrative examples shown and described. Accordingly, departures may be made from such details without departing from the scope of the present disclosure.

What is claimed is:

1. A method of reading labels, comprising:

displaying a live video feed including one or more objects each having a machine readable code;

in response to one object of the one or more objects being targeted, identifying the one object as a targeted object and starting a select timer that continues to run whether or not the targeted object continues to be targeted once the select timer has started; and selecting the targeted object in response to the targeted object being targeted when the select timer elapses.

2. The method of claim 1, further comprising:

in response to another object of the one or more objects being targeted prior to the select timer elapsing, identifying the other object as the targeted object and restarting the select timer.

3. The method of claim 1, further comprising:

in response to the targeted object not being targeted when the select timer elapses, starting a validate timer; and selecting the targeted object in response to the targeted object being retargeted before the validate timer elapses.

4. The method of claim 3, further comprising:

in response to the validate timer elapsing without the targeted object being retargeted, clearing the targeted object.

5. The method of claim 1, further comprising:

displaying an aiming feature on the live video feed; and determining an object is being targeted when at least a portion of the aiming feature touches the object.

6. The method of claim 5, wherein the aiming feature is in a fixed position in the live video feed.

7. The method of claim 1, further comprising:

detecting the machine readable code of one or more of the one or more objects.

8. The method of claim 7, further comprising:

displaying an identification feature indicating the machine readable code has been detected for each of the one or more objects for which the machine readable code is detected.

9. The method of claim 7, further comprising:

displaying an aiming feature on the live video feed, wherein an object is considered as being targeted when both at least a portion of the aiming feature touches the object and the machine readable code of the object is detected.

10. The method of claim 1, further comprising:

displaying an indication of a status of the select timer on the live video feed.

11. The method of claim 1, wherein the one or more objects include a plurality of objects each associated with an optical network asset, and the plurality of objects are arranged on an optical connector patch panel such that the machine readable codes are spaced less than 20 mm apart along at least one axis of the optical connector patch panel.

12. A system for reading labels, comprising:

a display;

a camera;

one or more processors operatively coupled to the display and the camera; and a memory including program code that, when executed by the one or more processors, causes the system to:

display a live video feed including one or more objects each having a machine readable code;

in response to one object of the one or more objects being targeted, identify the one object as a targeted object and start a select timer that continues to run whether or not the targeted object continues to be targeted once the select timer has started; and select the targeted object in response to the targeted object being targeted when the select timer elapses.

13. The system of claim 12, wherein the program code further causes the system to:

in response to another object of the one or more objects being targeted prior to the select timer elapsing, identify the other object as the targeted object and restart the select timer.

14. The system of claim 12, wherein the program code further causes the system to:

in response to the targeted object not being targeted when the select timer elapses, start a validate timer; and select the targeted object in response to the targeted object being retargeted before the validate timer elapses.

15. The system of claim 14, wherein the program code further causes the system to:

in response to the validate timer elapsing without the targeted object being retargeted, clear the targeted object.

16. The system of claim 12, wherein the program code further causes the system to:

display an aiming feature on the live video feed; and determine an object is being targeted when at least a portion of the aiming feature touches the object.

17. The system of claim 12, wherein the program code further causes the system to:

detect the machine readable code of one or more of the one or more objects; and display an identification feature indicating the machine readable code has been detected for each of the one or more objects for which the machine readable code is detected.

18. The system of claim 12, wherein the program code further causes the system to:

display an indication of a status of the select timer on the live video feed.

19. The system of claim 12, wherein the one or more objects include a plurality of objects each associated with an optical network asset, and the plurality of objects are arranged on an optical connector patch panel such that the machine readable codes are spaced less than 20 mm apart along at least one axis of the optical connector patch panel.

20. A computer program product for reading labels, comprising:

a non-transitory computer-readable storage medium; and program code stored on the non-transitory computer-readable storage medium that, when executed by one or more processors, causes the one or more processors to:

display a live video feed including one or more objects each having a machine readable code;

in response to one object of the one or more objects being targeted, identify the one object as a targeted object and start a select timer that continues to run whether or not the targeted object continues to be targeted once the select timer has started; and select the targeted object in response to the targeted object being targeted when the select timer elapses.

* * * * *